United States Patent
Nazari et al.

(10) Patent No.: US 11,598,456 B1
(45) Date of Patent: Mar. 7, 2023

(54) PIPE CONNECTION WITH SPLIT SWIVEL RING

(71) Applicant: Freudenberg Oil & Gas, LLC., Houston, TX (US)

(72) Inventors: Hanif Nazari, Krokstadelva (NO); Finn Fredriksen, Drammen (NO)

(73) Assignee: Freudenberg Oil & Gas, LLC, Houston, TX (US)

( * ) Notice: Subject to any disclaimer, the term of this patent is extended or adjusted under 35 U.S.C. 154(b) by 0 days.

(21) Appl. No.: 17/401,212

(22) Filed: Aug. 12, 2021

(51) Int. Cl.
*F16L 23/032* (2006.01)
*F16L 23/024* (2006.01)

(52) U.S. Cl.
CPC .......... *F16L 23/032* (2013.01); *F16L 23/024* (2013.01)

(58) Field of Classification Search
CPC ....... F16L 23/032; F16L 23/024; F16L 23/02; F16L 23/0286; F16L 23/0283; F16L 23/028
USPC .......................... 285/415, 411, 414, 412, 368
See application file for complete search history.

(56) References Cited

U.S. PATENT DOCUMENTS

| | | | |
|---|---|---|---|
| 3,148,897 A | 9/1964 | Hurt et al. | |
| 4,205,866 A | 6/1980 | McCracken | |
| 4,478,438 A | 10/1984 | Elorriaga, Jr. | |
| 5,951,061 A | 9/1999 | Arlt, III et al. | |
| 7,114,752 B2 * | 10/2006 | Voelker | 285/415 |
| 7,401,821 B2 * | 7/2008 | Svetlik | F16L 23/0283 285/368 |
| 10,316,729 B2 * | 6/2019 | Oakes | F16L 23/032 |
| 2010/0230963 A1 * | 9/2010 | Gayer | F16L 23/032 285/415 |
| 2011/0037251 A1 * | 2/2011 | Rodgers | F16L 23/032 |
| 2014/0125057 A1 * | 5/2014 | Bouricet | F16L 23/028 |
| 2014/0239633 A1 * | 8/2014 | Swingley | F16L 23/0286 29/402.09 |

* cited by examiner

*Primary Examiner* — Zachary T Dragicevich
*Assistant Examiner* — William S. Choi
(74) *Attorney, Agent, or Firm* — Harness, Dickey & Pierce, P.L.C.; Daniel J. Sepanik, Esq.

(57) ABSTRACT

A pipe connection swivel joint assembly includes a pipe member having an end flange with a conical proximal surface. A split ring assembly includes a pair of swivel ring halves each having a conical inner surface disposed against the conical proximal surface of the pipe member. The pair of swivel ring halves further include a plurality of mounting holes extending axially through the pair of swivel ring halves and a plurality of ring fastening holes. An outer ring is connected to the pair of swivel ring halves by a plurality of split ring fasteners engaged with the plurality of ring fastening holes. The outer ring supports a pair of distance plates that are disposed between opposing ends of the pair of swivel ring halves.

3 Claims, 4 Drawing Sheets

PIPE CONNECTION WITH SPLIT SWIVEL RING

FIELD

The present disclosure relates to a pipe connection with split swivel ring.

BACKGROUND

This section provides background information related to the present disclosure which is not necessarily prior art.

Traditional swivel ring pipe connections require that the swivel ring be assembled to the pipe prior to welding the collar onto the pipe. It is desirable to provide an alternative swivel ring pipe connection that does not require the swivel ring be assembled to the pipe prior to welding the collar.

SUMMARY

This section provides a general summary of the disclosure, and is not a comprehensive disclosure of its full scope or all of its features.

A pipe connection swivel joint assembly includes a pipe member having an end flange with a conical proximal surface. A split ring assembly includes a pair of swivel ring halves each having a conical inner surface disposed against the conical proximal surface of the pipe member. The pair of swivel ring halves further include a plurality of mounting holes extending axially through the pair of swivel ring halves and a plurality of ring fastening holes. An outer ring is connected to the pair of swivel ring halves by a plurality of split ring fasteners engaged with the plurality of ring fastening holes. The outer ring supports a pair of distance plates that are disposed between opposing ends of the pair of swivel ring halves. The outer ring further includes a plurality of outer ring retainer bolts that engage a retainer groove in an outer surface of the end flange of the pipe member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
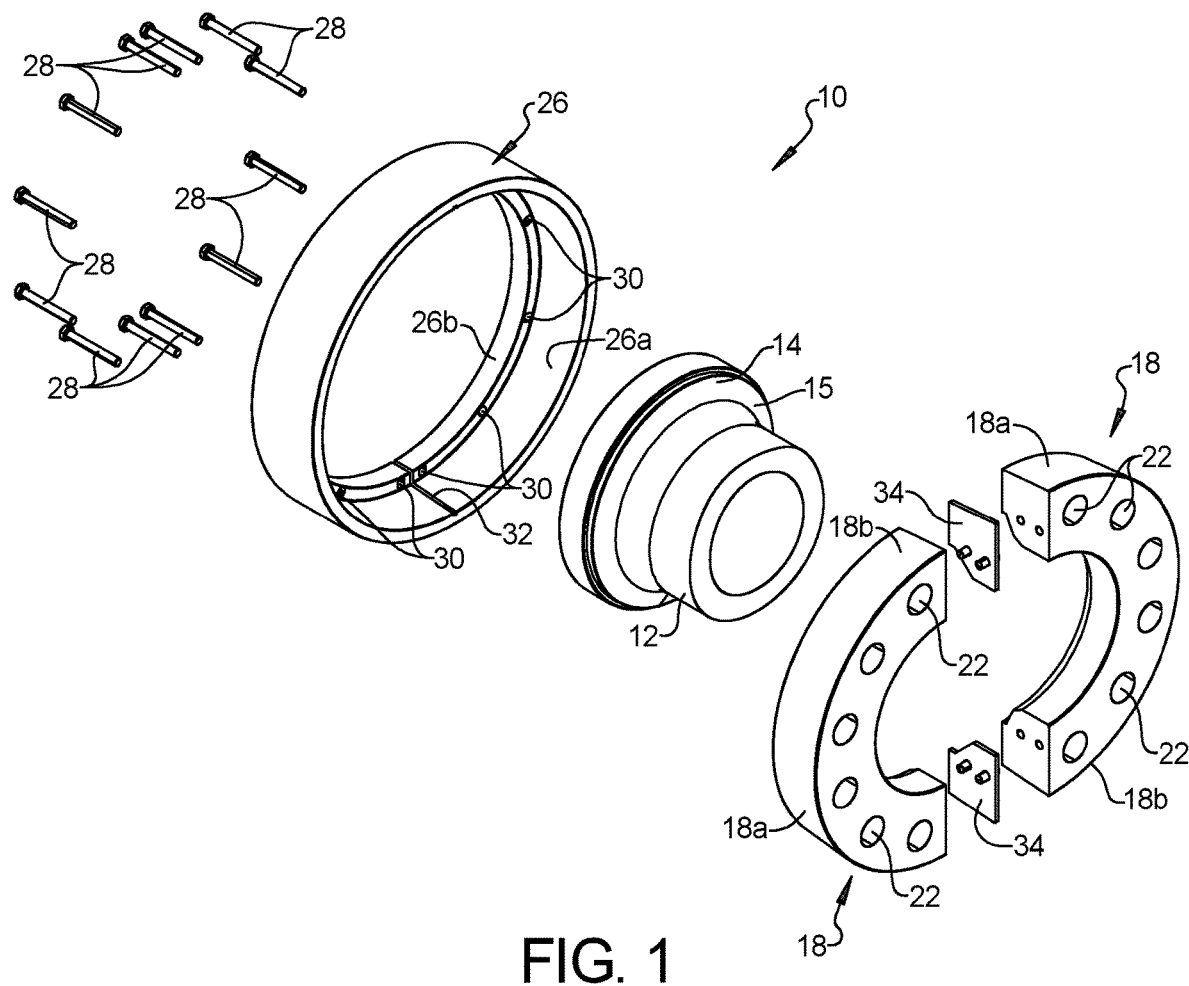
FIG. 1 is an exploded front perspective view of the pipe connection swivel joint assembly.
Figure 2:
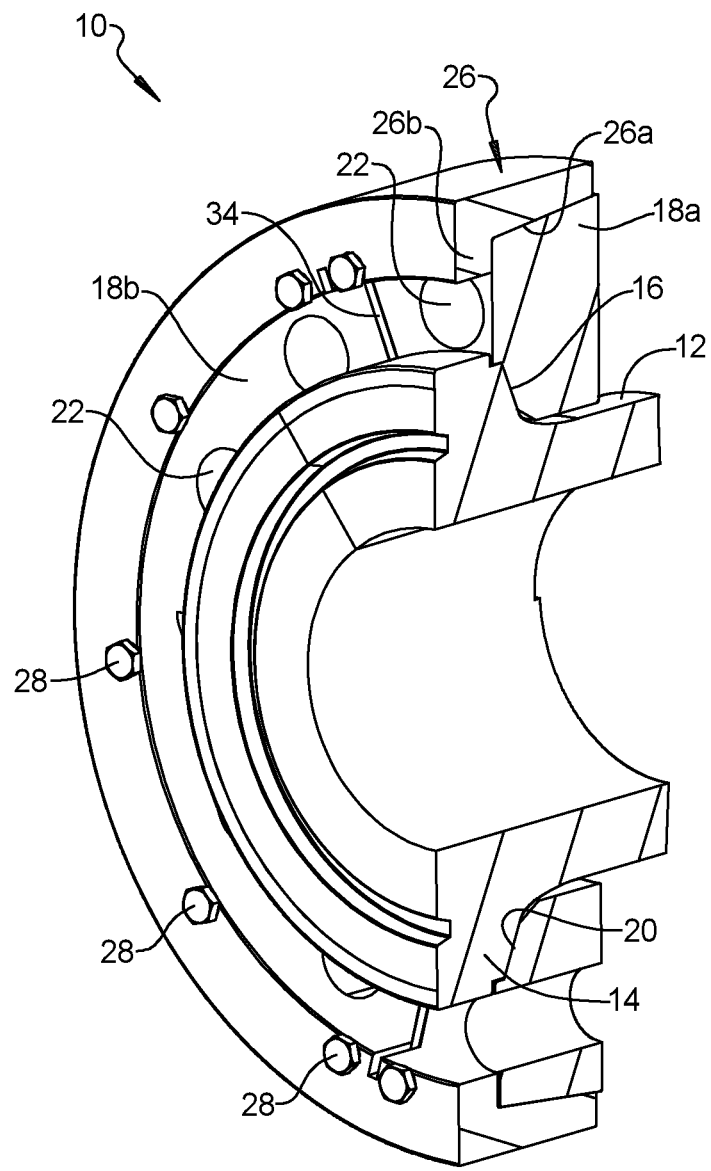
FIG. 2 is a cross-sectional front perspective view of the pipe connection swivel joint assembly.
Figure 3:
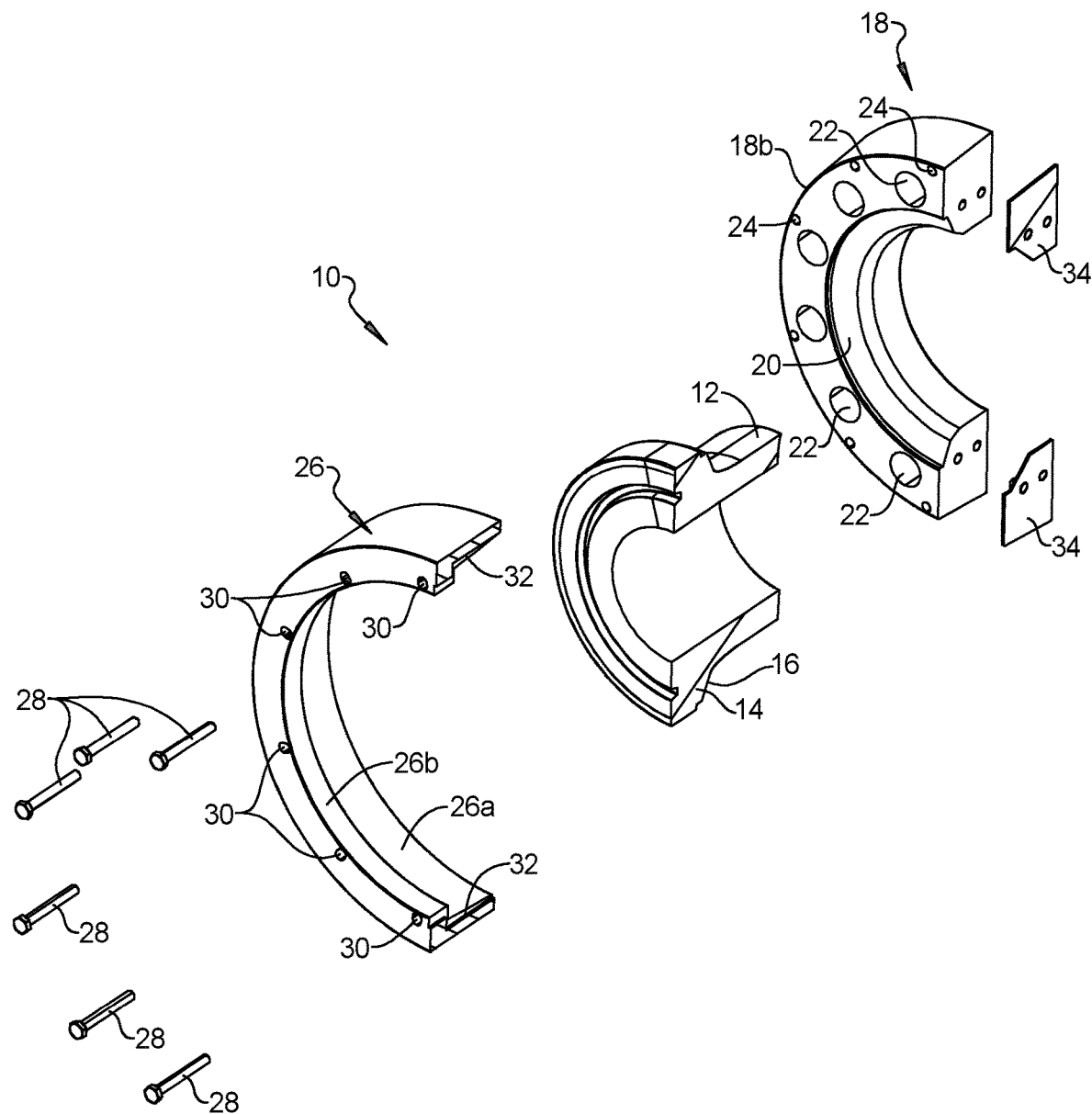
FIG. 3 is an exploded cross-sectional rear perspective view of the pipe connection swivel joint assembly according to the principles of the present disclosure.

With reference to FIGS. 1-3, a pipe connection swivel joint assembly 10 is shown including a pipe member 12 with an end flange 14 having a conical proximal surface 16. A split ring assembly 18 includes a pair of swivel ring halves 18a, 18b having a conical inner surface 20 that opposes the conical proximal surface 16 of the end flange 14. The pair of swivel ring halves 18a, 18b each include a plurality of mounting holes 22 and a plurality of ring fastening holes 24. An outer ring 26 is connected to the pair of swivel halves 18a, 18b by a plurality of split ring fasteners 28 extending through apertures 30 in the outer ring 26 and engaging threaded ring fastening holes 24 in the pair of swivel ring halves 18a, 18b. The outer ring 26 includes a conical inner surface 26a and a radially inwardly extending flange 26b. The conical inner surface 26a engages a conical outer surface 27 of the swivel ring hales 18a, 18b. A pair of distance plates 34 are disposed between the ends of the swivel ring halves 18a, 18b and are received in a pair of slots 32 in the outer ring 26. The distance plates 34 ensure that the bolt circle is kept during makeup. The outer ring 26 also gives a hoop load capacity to the assembled swivel ring 10. When applying the bolt-forces for final makeup, the assembly will be static due to this design.

Figure 4:
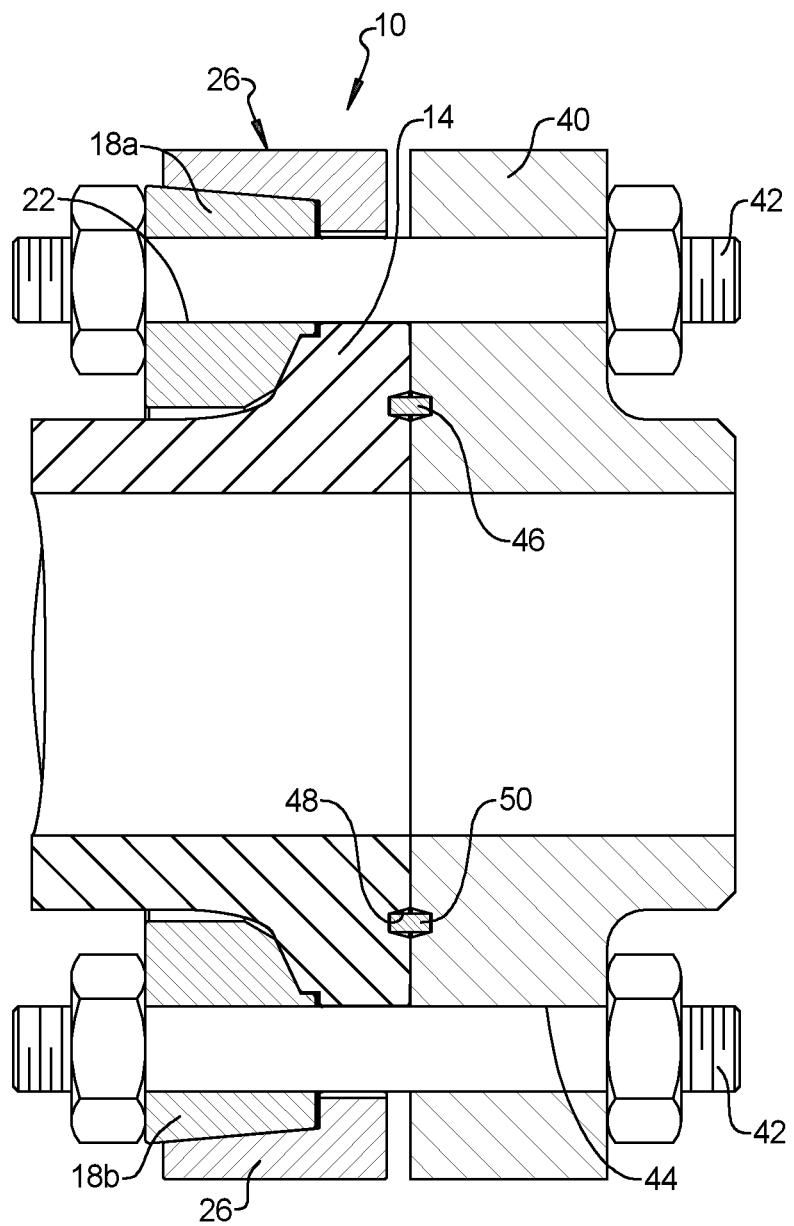
FIG. 4 is a cross-sectional of the pipe connection swivel joint assembly.

As shown in FIG. 4, the pipe connection swivel joint assembly 10 is shown connected to a static weld neck flange 40 by a plurality of mounting bolts 42 which extend through the mounting holes 22 in the swivel ring halves 18a, 18b and mounting holes 44 in the static weld neck flange 40. A seal member 46 is received in opposing grooves 48, 50 provided in a face of the end flange 14 and the static weld neck flange 40, respectively.

The present disclosure provides a split ring assembly 18 which, as opposed to traditional swivel rings, does not need to be mounted before the swivel collar is welded to a pipe or that the collar is an integral part of an end fitting or a valve. The benefit of the split swivel ring is to allow for the integration of the swiveling collar, seamlessly to the equipment, without having to enter the swivel ring to the pipe prior to welding the collar. Avoiding welding opens for a wider array of materials that can be used, no need for PWHT and no danger of distortion caused by heat input during welding.

The angled interface between the outer ring 26 and the swivel ring halves 18a, 18b brings the swivel ring halves 18a, 18b together until their inward radial movement is stopped by the distance plates 34. At this point, the bolt hole circle diameter (BCD), i.e. the positional tolerance of each ring fastening hole 24, shall be within the tolerances of the holes of an ordinary solid swivel ring and the mating flange. This will ensure that the bolts 28 have the space they need to avoid any bending due to interference between the bolts 28 and the split swivel ring halves 18a, 18b.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pipe connection swivel joint assembly, comprising:
   a pipe member having an end flange with a conical proximal surface;
   a split ring assembly including a pair of swivel ring halves each having a conical inner surface disposed against the conical proximal surface of the pipe member, the pair of swivel ring halves further including a plurality of mounting holes extending axially through the pair of swivel ring halves and a plurality of ring fastening holes; and
   an outer ring connected to the pair of swivel ring halves by a plurality of split ring fasteners engaged with the plurality of ring fastening holes, the outer ring supports a pair of distance plates that are disposed between opposing ends of the pair of swivel ring halves.

2. The pipe connection swivel joint assembly according to claim 1, further including a static weld neck flange including a plurality of mounting holes aligned with the plurality of mounting holes of the swivel ring holes and receiving a plurality of mounting bolts that secure the static weld neck flange to the pair of swivel ring halves.

3. A pipe connection swivel joint assembly, comprising:
   a pipe member having an end flange with a conical proximal surface;
   a split ring assembly including a pair of swivel ring halves each having a conical inner surface disposed against the conical proximal surface of the pipe member, the pair of swivel ring halves further including a plurality of mounting holes extending axially through the pair of swivel ring halves and a plurality of ring fastening holes; and
   an outer ring connected to the pair of swivel ring halves by a plurality of split ring fasteners engaged with the plurality of ring fastening holes.

* * * * *